Dec. 31, 1946.  W. P. SCHENKELBERG  2,413,657
HARROW ATTACHMENT FOR TRACTORS
Filed May 6, 1944  3 Sheets-Sheet 1

Inventor
William P. Schenkelberg
By Mawhinney & Mawhinney
Attorneys

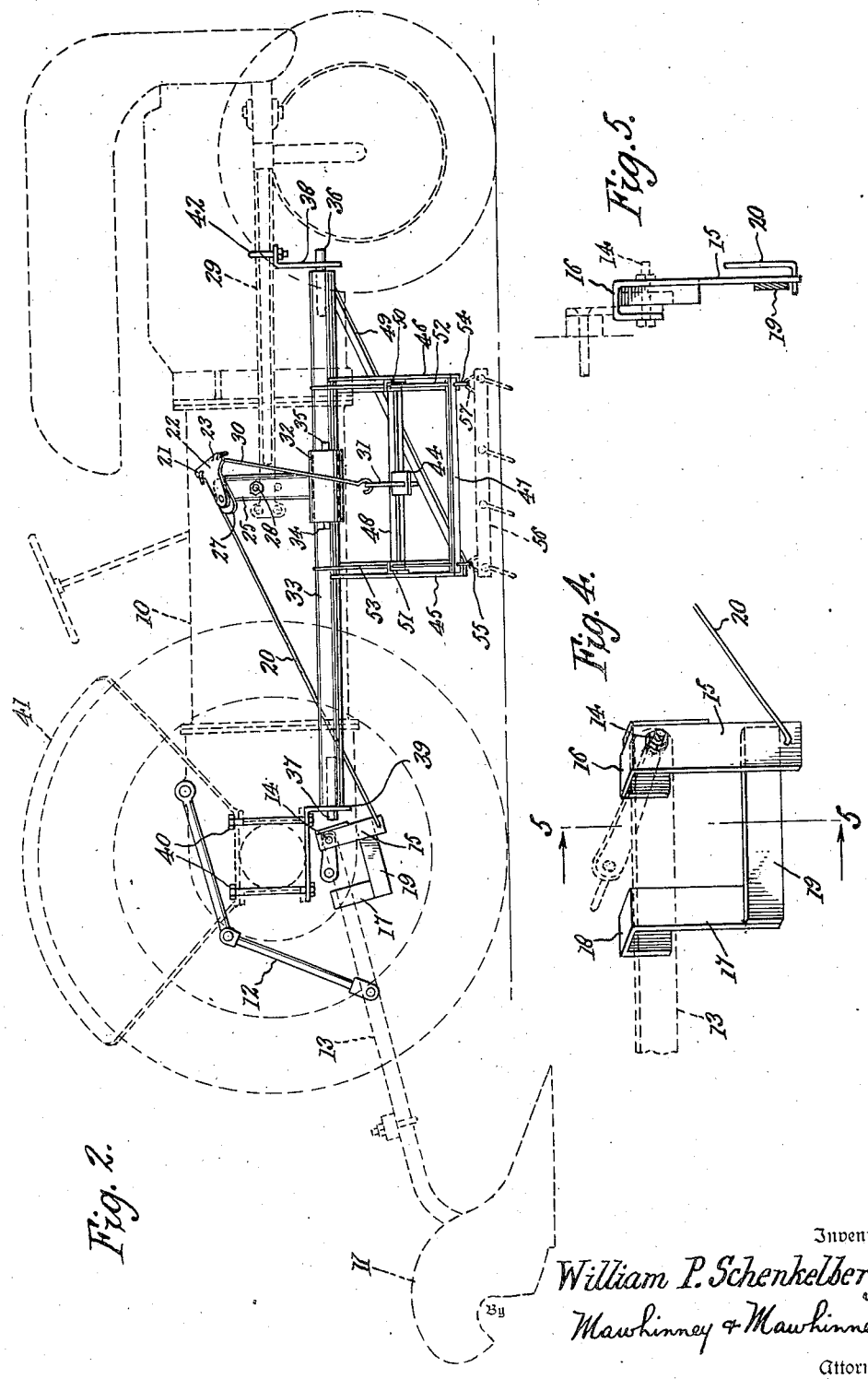

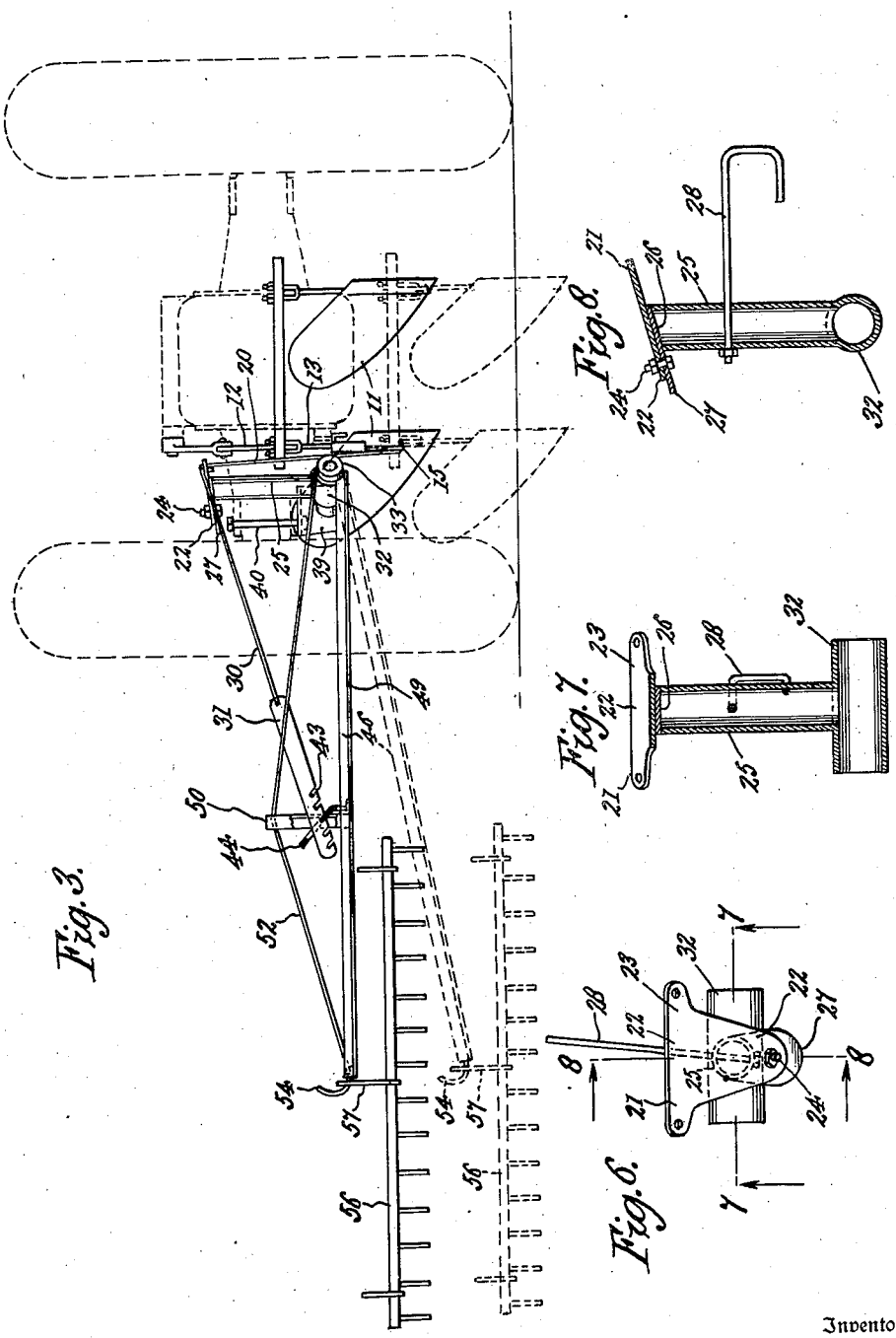

Patented Dec. 31, 1946

2,413,657

UNITED STATES PATENT OFFICE 2,413,657

HARROW ATTACHMENT FOR TRACTORS

William P. Schenkelberg, Carroll, Iowa

Application May 6, 1944, Serial No. 534,449

5 Claims. (Cl. 97—5)

The present invention relates to improvements in harrow attachments for tractors and the principal object of the invention is to provide an improved draft and lifting means for a conventional type harrow which will act to draw the harrow along at the side of the tractor and also act to lift and lower the tractor from and to soil engaging position.

In the drawings, which illustrate only one mechanical embodiment of which the invention is susceptible, the invention is illustrated as applied to a Ford type of tractor but it will be understood that it is equally useful in connection with other makes of tractors.

Another object of the invention is to provide an improved device for utilizing the power lift of a convenient tractor for lifting and lowering the harrow drag frame automatically with the raising and lowering of the plows at the back of the tractor.

A further object of the invention is to provide equipment of simple construction involving a draft attachment to receive a conventional form of harrow, which draft attachment is so constructed and arranged as to be mounted upon the side of conventional tractors in a quick manner with an operable connection adapted to be clipped onto a movable part of the plow elevating mechanism to thereby join the harrow carrier for concurrent lifting and raising operations from the power lift of the tractor.

Other objects of the invention are to generally simplify and strengthen the construction, promote high efficiency in operation, to reduce the strains incident to operational movements and in general to improve equipment of this character.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of a tractor, shown in dotted lines and of the improved harrow attachment shown in a lowered position.

Figure 2 is a side elevation of the same.

Figure 3 is a front elevation of the same.

Figure 4 is a perspective view of the clip connection to the power lift.

Figure 5 is a vertical section taken on the line 5—5 in Figure 4.

Figure 6 is a top plan view of the motion translating device.

Figure 7 is a vertical section taken on the line 7—7 in Figure 6.

Figure 8 is a similar view taken on the line 8—8 also in Figure 6.

Figure 1:
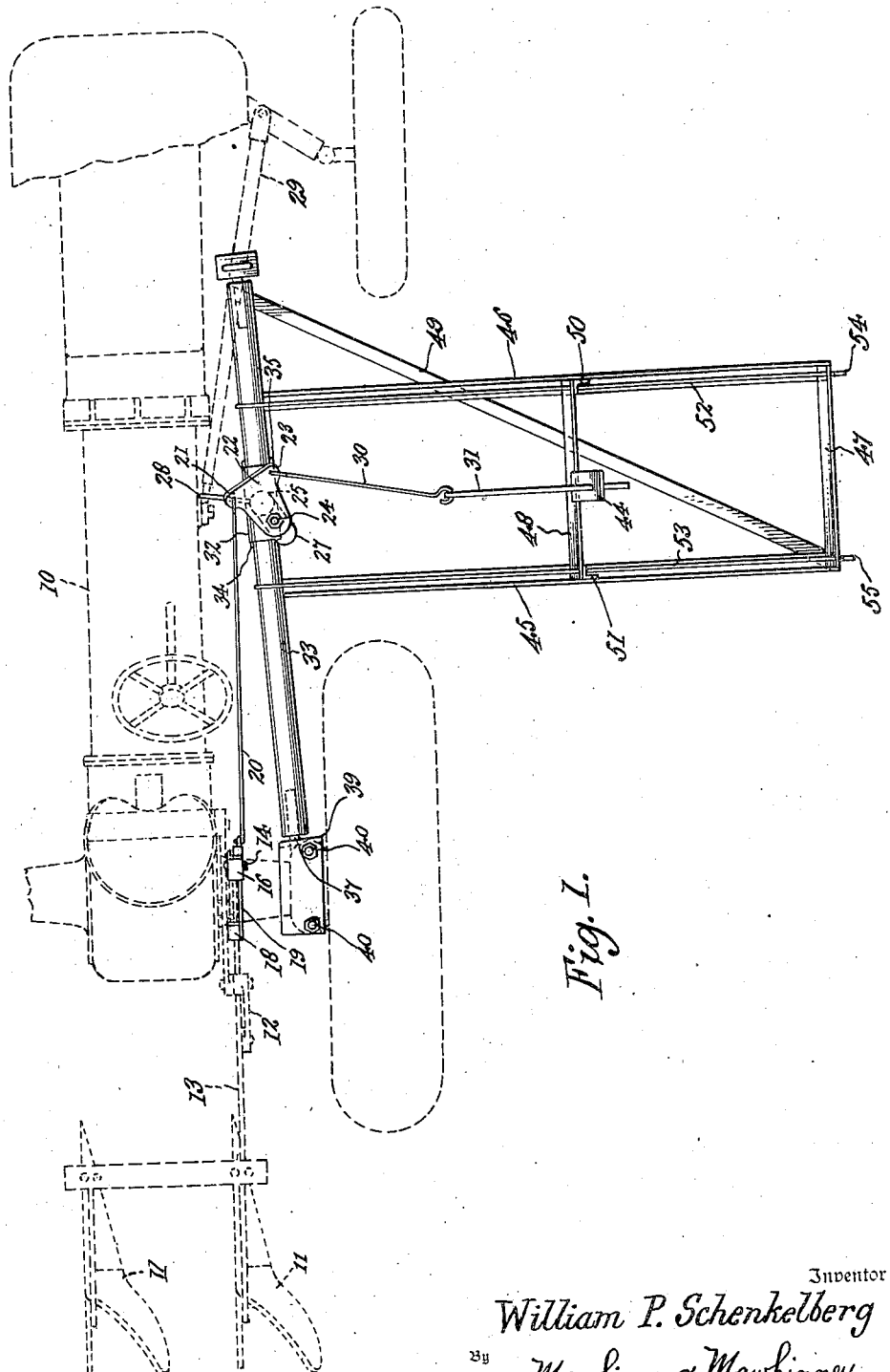

Referring more particularly to the drawings a Ford or other tractor is indicated in dotted lines at 10 with the usual trailing plows 11 which are adapted to be lifted and lowered by the power lift mechanism which is a part of the equipment of conventional tractors.

The plow lift is indicated generally at 12. This plow lift connects with the horizontal arm 13 pivoted at 14 on the tractor frame.

In accordance with the invention a clip device, shown more particularly in Figures 4 and 5 is constructed so as to be sprung or fitted over the horizontal arm 13. Such clip device preferably consists of a lever arm 15 positioned to fulcrum about the pivot 14. The lever arm 15 is secured in place by a substantially U-shaped clip 16 of spring metal or other desired material which is adapted to fit over the horizontal lift arm 13. In a similar manner a similar lever arm 17 carries a clip 18 having an open mouth at its lower portion and adapted to be sprung over the horizontal arm 13. The lever arms 15 and 17 are connected together by a bar 19, welded, brazed or otherwise secured to the lower portions of the two lever arms 15 and 17. The lever arm 15 which is the work arm preferably is longer than the arm 17 which acts as a brace arm together with the bar 19, the lower end of lever work arm 15 preferably extending below connecting bar 19 and perforated for receiving the hooked end of a rod 20. This rod 20 runs forward and diagonally upward and is hooked or otherwise connected with a perforated or other arm 21 of a lever plate or transmitting lever 22. Such plate 22 is generally in the form of a T with the perforated arms 21 and 23 in substantial alignment and at the opposite end from the fulcrum point 24 of the lever plate 22.

This lever plate and its mounting are shown more particularly in Figures 6, 7 and 8 in which the lever plate 22 is shown as assuming a diagonal position at the upper end of a tubular or other standard 25, the upper end of which is closed by a bearing plate 26 having an extension 27 at its lower side serving the purpose of receiving therethrough the fulcrum bolt 24 as more particularly illustrated in Figure 8.

The supporting standard 25 is intended to be held with its axis substantially vertical and rigidly in place. For this purpose a hooked rod 28 may well serve the purpose, the hook of the rod extending about the tractor brace 29.

Arm 23 of the bell crank lever 22 connects by means of a rod 30 or by other connection to an adjusting bar 31 which attaches to the frame work of the lift.

The lower end of the standard 25 may be conveniently carried upon a sleeve 32 (Figures 6, 7 and 8). The inside diameter of this sleeve is sufficiently large to permit it to slide over a shaft 33. The sleeve 32 is kept from axial sliding movement on the shaft 33 by two burrs 34, 35 or other suitable means. This permits the shaft 33 to rotate freely within the sleeve 32.

The shaft 33 may be a hollow type of metal or other appropriate material set approximately parallel with the longitudinal axis of the tractor and having trunnions 36 and 37 mounted respectively in bearings 38 and 39. The shaft 33 has free rotational movement in these bearings about a substantially horizontal axis. The bearing 39 may be attached to the tractor by the same bolts 40 which hold the guard 41 in place. The bearing plate 38 may be attached to the tractor brace 29 by means of a U-bolt 42 or other appropriate fastening.

The adjusting piece or bar 31 is preferably of flat strap iron cut with notches 43 (Figure 3) which are designed and adapted to catch into a slotted detent plate 44 which is rigidly affixed to the frame work of the lift.

This frame work in its preferred form consists of two longitudinal members 45 and 46 (Figure 1), two transverse members 47 and 48 and one sway brace 49 which extends diagonally across the rectangular frame and in fact lies outside the rectangular frame where it extends over to the front end portion of the rotary shaft 33 to which it may be affixed as by welding or the like.

This frame work is trussed or has a bridge effect which consists of two upright members or posts 51 and two rods 52 and 53. The two rods extend beyond the joint at which they are attached to the outer end of the frame work and are curved upwardly to form two hooks 54 and 55. The frame work is rigidly affixed to the tubular shaft 33 by welding or other suitable method of attachment.

The harrow 56 is attached by hooking its horizontal adjusting bar 57 over the hooks 54 and 55 (Figure 3). The freedom of movement of the shaft 33 about its horizontal axis permits the frame work to rotate to approximately a vertical position and thus be within the overall width of the tractor.

While the device may be made in any dimensions, for a standard Ford tractor, the following dimensions have given excellent results in practice:

| | Inches |
|---|---|
| Frame work | 20 x 56 |
| Angle irons in frame work | 1¼ |
| Sway brace strap | 1 |
| Rods 20 and 30 | ⅜ |
| Tubular shaft 33 made of 2" pipe. | |
| Tubular shaft, length | 53 |

The device is manufactured and sold separately from the tractor if desired and may be mounted thereon in a very simple manner by putting in place the bearing plates 37 and 38, at the same time mounting the shaft 33 therein and then clipping the clip device over the horizontal lift arm 13.

In use, whenever the power lift is actuated to lift the plows 11, the arm 13 will be accordingly angularly raised about its pivot point 14. This will cause lever arm 15 to be also rotated in a clockwise direction thereby exerting a rearward pull upon rod 20 and rotating the machine or bell crank lever 22 about its fulcrum 24. This action will exert a pull upon the rod 30 thus elevating the frame work and attached harrow in a rotary manner because of the connection of these parts to the shaft 10. It will be noted that the actuating lever 22 has an inclination both rearwardly and laterally outwards. In other words it is set at such an angle that the stresses in rods 20 and 30 and in the plate lever 22 itself all act approximately in one plane.

When the power lift mechanism of the tractor is reversed to lower the plows, the action of lever arm 15 will be reversed, that is it will have moved counter-clockwise or forwardly thus lowering the framework and attached harrow to an operative position with respect to the soil.

It is obvious that various changes and modifications may be made in the details of construction and design of the above specifically described embodiment of this invention without departing from the spirit thereof, such changes and modifications being restricted only by the scope of the following claims.

What is claimed is:

1. The combination with a tractor, a rotary shaft carried at the side of said tractor, a harrow attachment frame work comprising spaced longitudinal bars secured at one end to said shaft, transverse bars connecting the intermediate and outer portions of said longitudinal bars, a diagonal sway brace coupled between both said longitudinal and transverse bars and extending outside the rectangle formed by said frame work and having an end affixed to said shaft, and a truss structure for said frame work.

2. The combination with a tractor having a power lift, a rotary shaft, means detachably connected to said tractor for supporting said shaft for rotary movement at one side of said tractor, a harrow attachment affixed to said shaft, a transmitting lever supported from said tractor and having a plurality of arms, a connection from one arm to said power lift, a connection from the other arm to an intermediate point on said harrow attachment, a standard supporting said transmitting lever, a sleeve on which said standard is erected, said sleeve fitting non-rotatively about said shaft, means for preventing axial movement of said sleeve on said shaft, and means coupled between said standard and tractor for holding the standard and sleeve against angular motion.

3. The combination with a tractor having a power lift, a rotary shaft, means detachably connected to said tractor for supporting said shaft for rotary movement at one side of said tractor, a harrow attachment affixed to said shaft, a transmitting lever supported from said tractor and having a plurality of arms, a connection from one arm to said power lift, a connection from the other arm to an intermediate point on said harrow attachment, an adjusting piece in the connection between said harrow attachment and transmitting lever, said adjusting piece comprising a notched bar, and a spring plate on the harrow attachment having a slot to receive said bar and a wall of the slot to receive the notches of said bar.

4. In combination with a tractor having a power lift, a plow, and a plow beam pivoted to the tractor for vertically swinging movement, a connection between the power lift and plow beam a clip device mounted over said beam and secured to move therewith and comprising a work lever arm, a brace lever arm and connecting means between said arms, a harrow movably attached to the side of said tractor, and harrow lift means on the tractor coupled to said lever work arm and to said harrow.

5. The combination claimed in claim 4 characterized by the fact that each lever arm has a spring clip and the work lever arm extends down below said connecting means at its free end where it is coupled to the harrow lift means.

WILLIAM P. SCHENKELBERG.